United States Patent [19]
Nakazawa et al.

[11] Patent Number: 5,853,938
[45] Date of Patent: Dec. 29, 1998

[54] TONER FOR DEVELOPING ELECTROSTATIC IMAGE

[75] Inventors: Akihiko Nakazawa, Kanagawa-ken; Kenji Okado, Yokohama, both of Japan

[73] Assignee: Canon Kabushiki Kaisha, Tokyo, Japan

[21] Appl. No.: 183,782

[22] Filed: Jan. 21, 1994

Related U.S. Application Data

[63] Continuation of Ser. No. 819,062, Jan. 10, 1992, abandoned.

[30] Foreign Application Priority Data

| Jan. 11, 1991 | [JP] | Japan | 3-012522 |
| Jan. 29, 1991 | [JP] | Japan | 3-026698 |
| Nov. 26, 1991 | [JP] | Japan | 3-310826 |

[51] Int. Cl.$^6$ ............................................. G03G 9/097
[52] U.S. Cl. ........................... 430/110; 430/111; 430/137
[58] Field of Search .................... 430/110, 111, 430/106.6, 137

[56] References Cited

U.S. PATENT DOCUMENTS

| 2,221,776 | 11/1940 | Carlson | 95/5 |
| 2,297,691 | 10/1942 | Carlson | 95/5 |
| 2,618,552 | 11/1952 | Wise | 95/1.9 |
| 2,874,063 | 2/1959 | Greig | 117/17.5 |
| 3,909,258 | 9/1975 | Kotz | 96/1 R |
| 4,623,605 | 11/1986 | Kato | 430/110 |
| 4,837,100 | 6/1989 | Murofushi et al. | 430/106.6 |
| 5,053,305 | 10/1991 | Aoki et al. | 430/110 |
| 5,120,631 | 6/1992 | Kanbayashi et al. | 430/110 |
| 5,192,637 | 3/1993 | Saito et al. | 430/109 |

FOREIGN PATENT DOCUMENTS

| 0214308 | 3/1987 | European Pat. Off. . |
| 237038 | 9/1987 | European Pat. Off. ............... 430/110 |
| 42-23910 | 11/1967 | Japan . |
| 43-24748 | 10/1968 | Japan . |
| 48-47345 | 7/1973 | Japan . |
| 52-19535 | 2/1977 | Japan . |
| 56-64352 | 6/1981 | Japan . |
| 56-128956 | 10/1981 | Japan . |
| 58-1157 | 1/1983 | Japan . |
| 58-185405 | 10/1983 | Japan . |
| 58-216252 | 12/1983 | Japan . |
| 60-136755 | 7/1985 | Japan . |
| 61-160760 | 7/1986 | Japan . |
| 62-028772 | 2/1987 | Japan . |
| 2-27664 | 6/1990 | Japan . |
| 1402010 | 8/1975 | United Kingdom . |

OTHER PUBLICATIONS

Macholdt, Hans–Tobias and Alexander Sieber (1988) Dyes & Pigments 9, pp. 119–127, 1988.
English Translation of JP62–28772, Feb. 1987.
Patent Abstracts of Japan, vol. 11, No. 208 (P–593) [2655] Jul. 7, 1987.
Patent Abstracts of Japan, vol. 13, No. 269 (P–888) [3617] Jun. 21, 1989.
Patent Abstracts of Japan, vol. 14, No. 207 (P–1043) [4150] Apr. 26, 1990.

*Primary Examiner*—Christopher D. Rodee
*Attorney, Agent, or Firm*—Fitzpatrick, Cella, Harper & Scinto

[57] ABSTRACT

A toner for developing an electrostatic image has colorant-containing resin particles and amorphous fine titanium oxide particles comprising primary particles having an average particle diameter of from 1 m$\mu$ to 200 m$\mu$.

16 Claims, 1 Drawing Sheet

TONER FOR DEVELOPING ELECTROSTATIC IMAGE

This application is a continuation of application Ser. No. 07/819,062 filed Jan. 10, 1992, now abandoned.

BACKGROUND OF THE INVENTION

1. Field of the Invention

The present invention relates to a toner for developing an electrostatic image in image forming processes such as electrophotography, electrostatic recording or electrostatic printing.

2. Related Background Art

It is conventionally known to form an image on the surface of a photoconductive material by an electrostatic means and then develop the electrostatic image thus formed.

A large number of methods have been conventionally known as electrophotography, as disclosed in U.S. Pat. No. 2,297,691, Japanese Patent Publications No. 42-23910 and No. 43-24748 and so forth. In general, an electrostatic latent image is formed on a photosensitive member, utilizing a photoconductive material and according to various means, and subsequently a toner is adhered to the latent image to form a toner image corresponding to the electrostatic latent image.

Next, the toner image is transferred to an image holding medium such as paper if necessary, followed by fixing by the action of heat, pressure, heat-and-pressure, or solvent vapor. A copy is thus obtained. In the case when the process comprises a toner-image transfer step, the process is usually provided with the step of removing the toner remaining on the photosensitive member.

As developing methods by which the electrostatic latent image is formed into a visible image by the use of a toner, known methods can be exemplified by the powder cloud development as disclosed in U.S. Pat. No. 2,221,776, the cascade development as disclosed in U.S. Pat. No. 2,618,552, the magnetic brush development as disclosed in U.S. Pat. No. 2,874,063, and the method in which a conductive magnetic toner is used, as disclosed in U.S. Pat. No. 3,909,258.

As toners used in these developing methods, a fine powder obtained by dispersing a colorant in a thermoplastic resin has been commonly used. The thermoplastic resin most commonly includes polystyrene resins. Besides, polyester resins, epoxy resins, acrylic resins, urethane resins, etc. are also used. As the colorant, carbon black is most widely used. In the case of magnetic toners, black magnetic powders of an iron oxide type are widely used. In a system in which a two-component type developer is used, the toner is usually used by mixture with carrier particles such as glass beads, iron powder and ferrite articles.

The toner image finally formed on a copied image holding medium such as paper or transparent film for overhead projectors (hereinafter "OHP film") is permanently fixed onto the image holding medium by the action of heat, pressure or heat-and-pressure. In this fixing, the step of fixing by heat has been hitherto widely used.

In recent years, rapid progress has been made from monochromatic copying to full-color copying, and research has been conducted on two-color copying machines or full-color copying machines, which have been already put into practical use. For example, Journal of Electrophotographic Society, Vol. 22, No. 1 (1983) and Journal of Electrophotographic Society, Vol. 25, No. 1, p.52 (1986) issued reports relating to color reproduction and gradation reproduction.

In the formation of color images by full-color electrophotography, all colors are reproduced usually using three-color toners of yellow, magenta and cyan corresponding to the three primary colors.

In a method used therefor, first, light reflecting from an original is passed through a filter capable of transmitting color-separated light that stands in a relation of a complementary color with respect to the color of a toner, and an electrostatic latent image is formed on a photoconductive layer. Next, a toner image is held on an image holding medium (or image-receiving medium) through development and transfer steps. This procedure is successively repeated a plurality of times so that the subsequent toner images are superposed on one another on the same support while in registration, and thus a final full-color image is obtained through a one-time fixing step.

In general, in the case of the system in which a two-component type developer comprised of a toner and a carrier is used, the toner is statically charged by friction with the carrier to have the desired quantity of triboelectricity and charge polarity. Next, the electrostatic image formed is developed with the toner by the utilization of an electrostatic attraction force. Hence, in order to obtain a good visible image, it is necessary for the toner to have a good triboelectric chargeability which mainly depends on its relation with the carrier.

To cope with the problems as stated above, research has been conducted so that an excellent triboelectric chargeability can be achieved in materials that constitute developers, e.g., research on carrier core agents and carrier coat agents, optimizing an amount for coating, studies on charge control agents and fluidity-providing agents that are added to toners, and also improvements in binders that serve as mother materials.

For example, Japanese Patent Publication No. 52-32256 proposes a technique in which a charging aid such as chargeable fine particles is added to a toner. Japanese Patent Application Laid-open No. 56-64352 proposes to use a fine resin powder having a polarity opposite to that of toner. Japanese Patent Application Laid-open No. 61-160760 proposes a technique in which a fluorine-containing compound is added to a developer so that a stable triboelectric chargeability can be achieved.

Various proposals are also made on how to add the aforesaid charging aid. For example, what is commonly used is a method in which a charging aid is made to adhere to the surfaces of toner particles by the action of electrostatic force between toner particles and the charging aid or by the van der Waals force, etc. In that instance, a stirrer, a mixer or the like is used. In this method, however, it is not easy to uniformly disperse additive particles onto toner particle surfaces. Any additive particles which have not adhered to the toner particle surfaces tend to agglomerate with one another, so that it is difficult to avoid the presence of the additive particle in a free state. This tendency becomes marked with an increase in electrical resistivity of the charging aid and also with a decrease in particle diameter. In such instances, the performance of toner can be affected. For example, problems may occur such that the quantity of triboelectricity becomes unstable which causes an image density non-uniformity, which tends to provide an image with much fogging. When copies are continuously made, the content of the charging aid changes which makes it impossible to maintain the initial-stage image quality.

As another addition method there is a method in which the charging aid is previously added together with a binder resin and a colorant when toners are prepared. Since, however, the charge control agent can not be readily uniformly dispersed and also it is the charging aid or charge control agent present in the vicinity of toner particle surfaces that substantially contributes the chargeability property and those present in the interior of the particles of not contribute the chargeability, it is not easy to control the amount in which the charging aid is added or the quantity in which it is dispersed onto particle surfaces. Also in toners prepared by such a method, the quantity of triboelectricity is unstable, and hence it is not easy to obtain toners having satisfactory developing performance as stated above.

Moreover, in recent years, there is an increasing demand for making copying machines have a higher precision and making images have a higher quality. In the present technical field, it has been attempted to make toner particle diameter smaller so that a color image can be formed in a high image quality. Making the particle diameters of toner particles smaller results in an increase in the surface area per unit weight, tending to bring about an excessively large quantity of triboelectricity of the toner. This is accompanied by a possibility of insufficient image density or deterioration of durability. In addition, because of the large quantity of triboelectricity of the toner, toner particles may have so strong a mutual attractive force that the toner may have a low fluidity. That tends to bring about problems in the stability of toner feeding or in imparting of triboelectricity to the toner.

SUMMARY OF THE INVENTION

An object of the present invention is to provide a toner for developing an electrostatic image, that has solved the problems as discussed above.

Another object of the present invention is to provide a toner for developing an electrostatic image, that does not tend to be influenced by environment such as temperature and humidity and has a stable triboelectric chargeability.

Still another object of the present invention is to provide a toner for developing an electrostatic image, that has a fog-free, sharp image forming performance and also has a superior running stability.

The above objects of the present invention can be achieved by a toner for developing an electrostatic image, comprising colorant-containing resin particles and amorphous fine titanium oxide particles comprising primary particles having an average particle diameter of from 1 m$\mu$ to 200 m$\mu$

DESCRIPTION OF THE PREFERRED EMBODIMENTS

Figure 1:
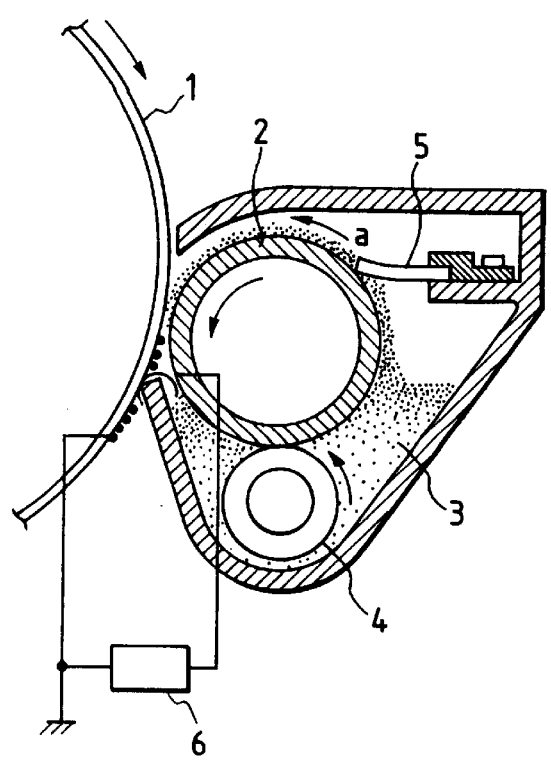
FIG. 1 illustrates an example of a developing apparatus in which a nonmagnetic one-component toner is used.

As a result of studies on triboelectric charge stability and fluidity of toners for developing electrostatic images, the present inventors have discovered that a toner making use of an external additive comprising amorphous fine titanium oxide particles having an average particle diameter of primary particles, of from 1 m$\mu$ to 200 m$\mu$ is very effective for making the triboelectric chargeability stable in various environments and also has a good fluidity.

A high-temperature sintering step is required in conventional processes for producing titanium oxide, and hence its particles tend to become coarse and the resulting fine titanium oxide particles have an anatase type or rutile type crystal structure. These fine titanium oxide particles tend to be present as amorphous particles (herein meant to be "particles lacking definite form") and can not readily give spherical and fine primary particles.

In the present invention, as a preferred embodiment, the toner may make use of amorphous fine titanium oxide particles preferably having an average particle diameter of primary particles, of from 1 to 100 m$\mu$, more preferably from 1 to 50 m$\mu$, still more preferably from 1 to 40 m$\mu$ and most preferably from 10 to 30 m$\mu$; the amorphous fine titanium oxide particles may preferably be titanium oxide particles comprised of primary particles, secondary particles and tertiary particles (i.e., those which may contain agglomerated titanium oxide particles), having an average particle diameter of from 5 to 150 m$\mu$, and more preferably from 5 to 80 m$\mu$, for those present on the surfaces of the colorant-containing resin particles; and the toner may have a bulk density of from 0.35 to 0.5 g/cm$^3$, a degree of agglomeration of from 2 to 15% and a weight average particle diameter of from 4 to 10 $\mu$m.

The above toner was found to have a stable chargeability in various environments, to also have a good fluidity, and to give an image with a high quality, excellent in fine-line faithfulness to an original copy, highlight reproduction, etc. The present invention has been thus accomplished.

In the present invention, it is particularly preferred to use amorphous fine titanium particles produced by thermal decomposition of a volatile titanium compound such as a titanium alkoxide in a gaseous phase at 600° C. or below. The reason therefor is that a high-temperature firing step is required in conventional processes for producing titanium oxide, and hence there are the problems that its particles tend to become coarse and also the resulting fine titanium oxide particles have an anatase type or rutile type crystal structure. These fine titanium oxide particles formed through the firing step undergo growth of particles during the production, and have the problems that they tend to be present as amorphous particles or indefinite-form particles and can not readily give spherical and fine primary particles. It has been confirmed that anatase-type titanium oxide in the form of fine particles can be obtained by mixing titanium tetrachloride and water in a twin-gaseous phase at 200° C. to 800° C. This method, however, produces a majority of amorphous particles, and can not readily provide spherical particles.

The fine titanium oxide particles used in the present invention may preferably be obtained from a volatile titanium compound, where the volatile titanium compound is vaporized or atomized at a relatively low temperature of 600° C. or below, and preferably from 250° C. to 400° C., followed by decomposition to form fine titanium oxide particles, which, immediately after the decomposition, are cooled in a time as short as possible to a temperature at which the fine titanium oxide particles no longer undergo re-coalescence, preferably to 100° C. or below.

For the purpose of preventing the fine titanium oxide particles from undergoing coalescence during cooling or after cooling or for the purpose of improving their collection or recovery, it is effective to use a dispersing agent, a surface modifier, etc.

Upon external addition of the above fine titanium oxide particles to the colorant-containing resin particles, their fine particle diameter and good dispersibility, as well as their spherical forms, effectively act to give a very good fluidity.

As a factor attributable to the stabilization of charging, it is preferable for the fine titanium oxide particles used in the present invention to be chargeable to the same polarity as the colorant-containing resin particles when brought into friction with iron powder, and as a result have a quantity of triboelectricity of not more than 30 μc/g as an absolute value, since such particles do not affect charge performance even when environments are changed. External addition of the fine titanium oxide particles having such features, to the colorant-containing resin particles enables control of the quantity of triboelectricity of toner that tends to become excess in an environment of low humidity. Moreover, even in the condition that tends to cause a shortage of the quantity of triboelectricity as in an environment of high temperature or at the initial stage where the toner is brought into friction, such particles do not tend to inhibit the triboelectric charging of the toner. It is thus possible to obtain charge performance which is stable as a whole.

In order for the fine titanium oxide particles to exhibit the above performance, they may preferably have an average particle diameter of primary particles, of from 1 to 40 mμ, and more preferably from 10 to 30 mμ, and the amorphous fine titanium oxide particles containing an agglomerate of fine titanium oxide particles, having an average particle diameter of from 5 to 80 mμ, and more preferably from 10 to 60 mμ, for those present on the colorant-containing resin particles, should be contained in an amount of from 0.01 to 5% by weight, preferably from 0.1 to 3% by weight and more preferably from 0.2 to 2% by weight, based on the weight of the colorant-containing resin particles.

An instance in which the fine titanium oxide particles have an average particle diameter larger than that within the above range or they are contained in an amount larger than the above amount tends to result in their insufficient dispersion or their liberation or separation from the colorant-containing resin particles, so that not only their effect may be damaged but also a difficulty may occur. An instance in which they have an average particle diameter smaller than that within the above range or they are contained in an amount smaller than that within the above range tends to result in their insufficient absolute quantity or their embedment into the colorant-containing resin particles to bring about an insufficency in charge controllability or fluidity of the toner.

In the present invention, when the fine titanium oxide particles are used in full-color toners, they give very good transparency to visible light and cause no hindrance of color reproduction and color mixture, because they have an average particle diameter as very small as from 5 to 150 mμ, and preferably from 5 to 80 mμ, for those present on colorant-containing resin particles. Thus it is also possible to obtain a very sharp projected image of OHP films having color images.

Hitherto, examples of adding titanium oxide to toners are disclosed, for example, in Japanese Patent Application Laid-open No. 48-47345, in which a metal oxide such as titanium oxide is used as an abrasive, and Japanese Patent Applications Laid-open No. 52-19535 and No. 56-128956, in which it is used as a fluidizing agent. The present invention, however, in the first place intends for making charge performance stable in various environments, and is different from the invention disclosed in these publications. As disclosures relating to charging, Japanese Patent Applications Laid-open No. 58-185405 and No. 58-216252 disclose that fine titanium oxide particles having been subjected to a surface treatment are used to impart a positive chargeability to a toner. Japanese Patent Applications Laid-open No. 58-1157 and No. 60-136755 also disclose that fine titanium oxide particles are used in combination with hydrophobic silica for the purpose of controlling the quantity of triboelectricity of silica that tends to become excessive, when the hydrophobic silica is used as an external additive. In the present invention, on the other hand, they are used to control the charge performance of color toner particles themselves to reduce the difference in quantity of triboelectricity that occurs depending on variations of temperature and/or humidity, and to impart a sufficient fluidity to the toner without use of silica. Thus, the present invention is different from that disclosed in these publications.

Starting materials for the titanium oxide used in the present invention may include titanium alkoxides such as titanium tetramethoxide, titanium tetraethoxide, titanium tetrapropoxide, titanium tetrabutoxide and diethoxytitanium oxide. Besides, it is also possible to use titanium tetrahalides such as titanium tetrachloride and titanium tetrabromide, and titanium compounds with volatility, such as a monoalkoxytitanium trihalide, an alkoxytitanium dihalide and a trialkoxytitanium monohalide.

When the volatile titanium compound is vaporized or atomized, the volatile titanium compound may preferably be diluted with a diluent gas to a concentration of from 0.1 to 10% by volume. This diluent gas plays a role as a carrier gas for introducing the vaporized volatile titanium compound into a decomposition furnace in which the compound is decomposed.

Here, an inert gas such as argon gas, helium gas or nitrogen gas, water vapor or oxygen is used as the diluent gas. In particular, it is preferred to use helium gas and/or nitrogen gas. A dispersing agent, a surface modifier, etc. may also be optionally incorporated.

In the present invention, the decomposition is carried out after the volatile titanium compound has been vaporized or atomized, and hence an oxygen-containing gas is required except the case when oxygen-containing compounds such as alkoxides are used.

The decomposition may preferably be carried out at a temperature of 600° C. or below, more preferably from 250° to 400° C., and particularly preferably from 250° to 350° C. A temperature lower than 250° C. makes it difficult to obtain a satisfactory rate of decomposition. On the other hand, a temperature higher than 600° C. makes it difficult to obtain fine particles of titanium oxide.

It is also preferred in the present invention to carry out, immediately after the decomposition, rapid cooling to a temperature at which no coalescence occurs so that the fine titanium oxide particles thus produced no longer undergo re-coalescence with one another in the gaseous phase. This rapid cooling prevents coalescence of the titanium oxide particles, so that the spherical and fine particles of amorphous titanium oxide thus obtained can be collected and recovered in the state of primary particles.

The fine titanium oxide particles may be subjected to a surface treatment so long as the properties of fine titanium oxide powder are not damaged, as exemplified by a hydrophobic treatment carried out to control charge performance of the toner or improve the stability thereof in an environment of high humidity. In the case when the hydrophobic treatment is carried out, the powder should be made hydrophobic to a degree ranging from 10% to 80%, preferably from 40% to 80%, and more preferably from 50% to 70%. Making it hydrophobic to a degree less than 10% can not bring about the effect of hydrophobic treatment in the case of the fine titanium oxide powder to tend to give no good charge retention in an environment of high humidity, and that to a degree more than 80% tends to cause a deterioration of charge performance particularly in an environment of low humidity or a lowering of fluidity.

The hydrophobic treatment can be effectively carried out by a method in which the powder is made hydrophobic by treating the fine titanium oxide particles having been thermally decomposed, together with, for example, a refrigerant comprised of an inert gas such as nitrogen gas, when the rapid cooling is carried out.

In order to further stabilize the charging of the toner, it is preferable for the fine titanium oxide particles to be capable of being charged to the same polarity as the colorant-containing resin particles when brought into friction with iron powder. As a result the particles possess a quantity of triboelectricity of not more than 30 μc/g as an absolute value, since such particles do not affect charge performance even when environments are changed. External addition of the fine titanium oxide particles with such features to the toner enables control of the quantity of triboelectricity of color toners that tends to become excess in an environment of low humidity. Moreover, even in the condition that tends to cause a shortage of the quantity of triboelectricity as in an environment of high temperature or at the initial stage where the toner is brought into friction, such particles do not tend to inhibit the triboelectric charging. It is thus possible to obtain stable charge performance as a whole.

In the present invention, as another preferred embodiment, the toner may contain external additives comprised of an external additive-A comprising the fine titanium oxide particles and another external additive-B which are externally added to the surfaces of the colorant-containing resin particles. The toner may have a quantity of triboelectricity of not more than 20 μc/g as an absolute value when the external additive-A and iron powder are brought into friction. The toner may be chargeable to a polarity reverse to that of the colorant-containing resin particles and in a quantity of triboelectricity of not less than 10 μc/g as an absolute value when the external additive-B and iron powder are brought into friction, and satisfies the condition of a≧b when the average particle diameter of said external additive-A is regarded as $\underline{a}$ μ and the average particle diameter of said external additive-B as $\underline{b}$ μ.

As a result of extensive studies on the environmental stability of chargeability of color toners for developing an electrostatic image, the present inventors have discovered that the chargeability can be very effectively stabilized in various environments when at least two kinds of external additives are used as the external additive, comprised of an external additive-A capable of giving a quantity of triboelectricity of not more than 20 μc/g as an absolute value when brought into friction with iron powder and an external additive-B chargeable to a polarity reverse to that of the colorant-containing resin particles and in a quantity of triboelectricity of not less than 10 μc/g as an absolute value when brought into friction with iron powder.

The reason therefor is that any charge-up due to excessive friction of binder resin is moderated by the addition of the above additive having the polarity reverse to the toner.

The addition of the additives having the reverse polarity also enables acceleration of the rise of charging of the toner, so that a charge performance very stable from the initial stage can be achieved.

The reason therefor is still unclear. It can be presumed as follows: At the initial stage of charging of the toner, the additive-B with the reverse polarity is charged in the state it is more strongly attracted to a charge-providing member than to the colorant-containing resin particles. Hence, the rise of charging of the colorant-containing resin particles can be accelerated. On the other hand, once the charging has risen, the additive-B is more strongly attracted to the colorant-containing resin particles than to the charge-providing member, so that it functions to moderate excessive charging. Thus, the toner of the present invention can stably maintain the levels of the rise of charging and quantity of saturated triboelectricity in various environments.

In order to make the above action more effective, the additive-B with the reverse polarity must have a smaller average particle diameter than the additive-A used in combination. This is because if the additive-B with the reverse polarity has a larger average particle diameter, the colorant-containing resin particles may electrostatically agglomerate one another through the additive with the reverse polarity, resulting in a decrease in the stated effect. The additive-B with the reverse polarity must also have a quantity of triboelectricity of not less than 10 μc/g when brought into friction with iron powder. This is a value preferable for moderating the colorant-containing resin particles. A value smaller than it may result in a lowering of the effect of moderation. In particular, in order to make the effect of moderation more effective, the quantity of triboelectricity may preferably be $Q_L > Q_H$ where the quantities thereof obtained when the additive is brought into friction with iron powder in environments of 30° C./80% RH and 20° C./10% RH are regarded as $Q_H$ μc/g and $Q_L$ μc/g, respectively.

In the present invention, in order to stabilize the performance of the additive, the additive-B with the reverse polarity may preferably be added in an amount of from 0.1 to 5% by weight based on the weight of the colorant-containing resin particles, which amount correlates with the amount of the additive-A.

The additive-B with the reverse polarity is preferable also when the toner is made to have a smaller particle diameter. Making the toner to have a smaller particle diameter results in an increase in contact points between toner particles which tends to cause blocking. On the other hand, the additive-B with the reverse polarity, having an appropriate particle size, can serve as good spacer particles to ring about good results.

In the present invention, it has been confirmed that, when the additive-B is used in combination with silica commonly available as a fluidity improver, the silica narrows the latitude of stability of the charging having been stabilized because of the aforesaid effect of moderation. In the present invention, it is preferred to use the additive-B in combination with the additive-A having a quantity of triboelectricity of not more than 20 μc/g as an absolute value when brought into friction with iron powder.

Thus, the above additive-A having substantially constant charge performance without influence by temperature and/or humidity can impart fluidity without damage of the charging stability of the toner, so that developing performance and transfer performance can be improved.

The additive-B must have a smaller particle diameter than the additive-A, and it is preferred to use a fine silica powder having been surface-treated so as to give a suitable charge performance. As a fine silica powder to be surface-treated, any of dry process silica and wet process silica can be used. The dry process silica is preferred in view of the particle diameter.

A proposal to use silica and titanium oxide in combination is reported, for example, in Japanese Patent Publication No. 2-27664. This proposes to use titanium oxide to prevent the phenomenon of charge-up that may occur when silica is used alone, and is different from the present invention in that point. Japanese Patent Application Laid-open No. 62-229158 also makes a proposal as a positively chargeable toner, which, however, is different in that the present invention is intended for a negatively chargeable toner.

The dry process herein referred to is a process for preparing fine silica powder produced by vapor phase oxidation of a silicon halide derivative. For example, it is a process that utilizes heat decomposition oxidation reaction in the oxyhydrogen of silicon tetrachloride gas. The reaction basically proceeds as follows.

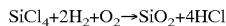

In this preparation step, it is also possible to use a metal halide derivative such as aluminum chloride or titanium chloride together with the silicon halide derivative to give a composite fine powder of silica and other metal oxide. The fine silica powder of the present invention includes these, too.

As for a method in which the fine silica powder used in the present invention is prepared by the wet process, conventionally known various methods can be used. For example, there is a preparation method in which sodium silicate is decomposed using an acid, as shown below.

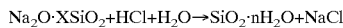

Besides, there is a method in which sodium silicate is decomposed using an ammonium salt or alkali salt, a method in which an alkaline earth metal silicate is produced from sodium silicate followed by decomposition using an acid to give silicic acid, a method in which an aqueous sodium silicate solution is passed through an ion-exchange resin to give silicic acid, and a method making use of naturally occurring silicic acid or silicate.

To the fine silica powder herein referred to, it is possible to apply any of anhydrous silicon dioxide (silica), and other silicates such as aluminum silicate, sodium silicate, potassium silicate, magnesium silicate and zinc silicate.

The fine silica powder may be treated with a silane coupling agent.

An organic group that can serve as a positively triboelectrically chargeable moiety of the silane coupling agent can be exemplified by an amino group and a nitrogen-containing heterocyclic group. The nitrogen-containing heterocyclic group may include unsaturated heterocyclic groups and saturated heterocyclic groups, and those respectively known in the art can be used. A compound having the unsaturated heterocyclic group can be exemplified by the following:

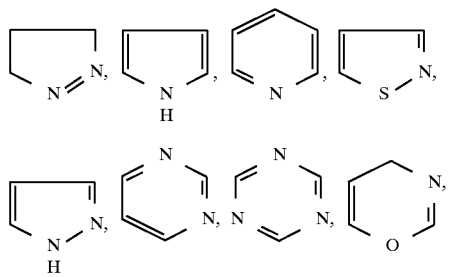

-continued

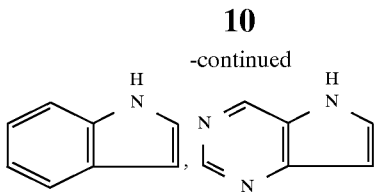

A compound having the saturated heterocyclic group can be exemplified by the following:

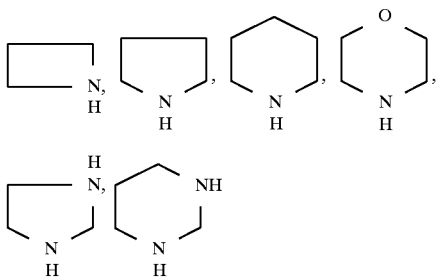

Nitrogen-containing salt compounds such as quaternary ammonium salts and pyridinium salts can also exemplify it. Phosphines and phosphonium salts can still also exemplify it. Taking account of readiness for synthesis and cost, amino groups or nitrogen-containing heterocyclic groups are preferred.

The silane coupling agent can be synthesized by conventionally known methods. Basically, a hydrohalogenosilane or hydroalkoxysilane and the above compound having the alkene moiety in which the positively triboelectrically chargeable moiety (or optionally a negatively triboelectrically chargeable moiety) has been introduced are reacted in the presence of a catalyst such as a platinum-containing compound.

For example, in the case of diethylaminopropyltriethoxysilane, it can be obtained by reacting triethoxyhydrosilane with allydiethylamine in the presence of a platinum chloride catalyst, or reacting chloropropyltriethoxysilane with diethylamine and thereafter the reaction product is further reacted with sodium methoxide, followed by purification.

The fine silica powder having been treated with the silane coupling agent as described above can improve the environmental stability of the toner. It may be further treated with a silicone oil so that moisture resistance, fluidity and transfer performance can be further improved. The treatment with a silicone oil brings about an improvement in lubricity of the fine silica powder, so that the fluidity of the toner can be increased and the performance of its transport from a photosensitive drum can be much more improved.

The fine silica powder should preferably be made hydrophobic to a degree (a hydrophobicity) of not less than 90%, and more preferably not less than 95%. Making the powder hydrophobic to a degree less than 90% may result in water absorption of the fine silica powder in an environment of high humidity, making it impossible to obtain an image with a high quality level.

The additive-A used in the present invention may be used in an amount of 0.01 to 5% by weight, and preferably from 0.05 to 2% by weight, based on the weight of the colorant-containing resin particles, which amount correlates with the amount of the additive-B used. Its use in an amount less than 0.01% by weight makes it difficult to achieve an appropriate fluidity, and its use in an amount more than 5% by weight tends to cause the problems of toner scatter and an increase in fogging. The additive-B may preferably be used in an amount smaller than the additive-A in order to achieve stabilization.

What is effective for stabilizing the charge performance of the toner is resin particles with reverse polarity, capable of moderating excessive charging of the color toner. In order to exhibit such effect, the resin particles should have particle diameters of from 20 to 200 m$\mu$ and be added in an amount ranging from 0.1 to 5.0% by weight of the weight of the color toner.

There are no particular limitations on monomers that constitute the reverse-polarity resin particles optionally used in combination in the present invention, provided that they must be selected taking account of the quantity of triboelectricity of the toner. Addition-polymerizable monomers usable in the present invention may specifically include the following monomers.

They include styrene, and derivatives thereof as exemplified by alkyl styrenes such as methyl styrene, dimethyl styrene, trimethyl styrene, ethyl styrene, diethyl styrene, triethyl styrene, propyl styrene, butyl styrene, hexyl styrene, heptyl styrene and octyl styrene, halogenated styrenes such as fluorostyrene, chlorostyrene, bromostyrene, dibromostyrene and iodostyrene, and also nitrostyrene, acetylstyrene and methoxystyrene.

They also include addition-polymerizable unsaturated carboxylic acids, i.e., addition-polymerizable unsaturated aliphatic monocarboxylic acids such as acrylic acid, methacrylic acid, $\alpha$-ethylacrylic acid, crotonic acid, $\alpha$-methylcrotonic acid, $\alpha$-ethylcrotonic acid, isocrotonic acid, tiglic acid and ungelic acid, or addition-polymerizable unsaturated aliphatic dicarboxylic acids such as maleic acid, fumaric acid, itaconic acid, citraconic acid, methaconic acid, glutaconic acid and dihydromuconic acid.

Any of these carboxylic acids formed into metal salts can also be used, and such formation into metal salts can be carried out after completion of polymerization.

The monomers may also include compounds obtained by esterification of any of the above addition-polymerizable unsaturated carboxylic acids with an alcohol such as an alkyl alcohol, an alkyl halide alcohol, an alkoxyalkyl alcohol, an aralkyl alcohol or an alkenyl alcohol. Such an alcohol may specifically include alkyl alcohols such as methyl alcohol, ethyl alcohol, propyl alcohol, butyl alcohol, amyl alcohol, hexyl alcohol, heptyl alcohol, octyl alcohol, nonyl alcohol, dodecyl alcohol, tetradecyl alcohol and hexadecyl alcohol; alkyl halide alcohols obtained by halogenating part of any of these alkyl alcohols; alkoxyalkyl alcohols such as methoxyethyl alcohol, ethoxyethyl alcohol, ethoxyethoxyethyl alcohol, methoxypropyl alcohol and ethoxypropyl alcohol; aralkyl alcohols such as benzyl alcohol, phenylethyl alcohol and phenylpropyl alcohol; and alkenyl alcohols such as allyl alcohol and crotonyl alcohol.

They still also include amides and nitriles derived from any of the above addition-polymerizable unsaturated carboxylic acids; aliphatic monoolefins such as ethylene, propylene, butene and isobutylene; aliphatic olefin halides such as vinyl chloride, vinyl bromide, vinyl iodide, 1,2-dichloroethylene, 1,2-dibromoethylene, 1,2-diiodoethylene, isopropenyl chloride, isopropenyl bromide, allyl chloride, allyl bromide, vinylidene chloride, vinyl fluoride and vinylidene fluoride; and conjugated aliphatic diolefins such as 1,3-butadiene, 1,3-pentadiene, 2-methyl-1,3-butadiene, 2,3-dimethyl-1,3-butadiene, 2,4-hexadiene and 3-methyl-2,4-hexadiene.

They may further include vinyl acetates, vinyl ethers, and nitrogen-containing vinyl compounds such as vinylcarbazole, vinylpyridine and vinylpyrrolidone.

Polymers of any one or more kinds of these monomers can be used in the fine powder.

The reverse-polarity resin particles to be used are not limited to only one kind, and plural kinds of resin particles can be used in combination.

The reverse-polarity resin particles used in the present invention can be prepared by any processes so long as they are those by which spherical fine particles can be prepared, as exemplified by spray drying, suspension polymerization, emulsion polymerization, soap-free polymerization, seed polymerization and mechanical pulverization. Of these processes, particularly preferred is soap-free polymerization that causes no inhibition of charge performance of the toner and less environment-dependent variations of electrical resistivity since there can be no emulsifying agent remaining after the polymerization.

The reverse-polarity resin particles may be optionally subjected to particle surface treatment. The surface treatment can be carried out by a method in which particle surfaces are treated with a metal such as iron, nickel, cobalt, copper, zinc, gold or silver by vacuum deposition or plating, a method in which any of the above metals, a metal oxide such as conductive zinc oxide, or the like is fixed by ionic adsorption or external addition, or a method in which a triboelectrically chargeable organic compound such as a pigment or a dye and also a polymer resin, etc. may be supported by coating or external addition.

The reverse-polarity resin particles are required to have a molecular weight distribution wherein a peak molecular weight is in the range of from 10,000 to 5,000,000, preferably in the range of from 20,000 to 1,000,000. Resin particles with a peak molecular weight larger than 5,000,000 may adversely affect the fixing performance of the color toner, and those with a peak molecular weight smaller than 10,000 may cause contamination of magnetic particles or bring about a poor blocking resistance.

In the present invention, use of the fine titanium oxide particles previously described makes it possible to properly satisfy the degree of agglomeration and bulk density defined within the range previously set out, even when the toner has a weight average particle diameter of from 4 to 10$\mu$.

When the colorant-containing resin particles are made to have an average particle diameter of as small as from 4 to 10$\mu$, the toner may have so high a degree of agglomeration and so large a bulk density that the problems have tended to arise such that the performance of transport of toner from a toner hopper to a container inside a developing assembly is lowered or the charging is insufficient.

For the purpose of lowering the degree of agglomeration, it is common to add, for example, a colloidal fine silica powder having a large BET surface area. Addition of the colloidal fine silica powder, however, inevitably tends to cause a lowering of environmental stability, which may result in a lowering of the quantity of triboelectricity of the toner in an environment of high humidity or an increase in the quantity of triboelectricity of the toner in an environment of low humidity, making it difficult to achieve a proper image density.

Some of conventional fine titanium oxide particles also have a primary particle diameter of about as small as 20 m$\mu$. Such fine titanium oxide particles, however, frequently cause agglomeration of primary particles because of the method for their manufacture. Thus it has been difficult to satisfy the degree of agglomeration and bulk density of the toner as desired in the present invention.

In the colorant-containing resin particles according to the present invention, a charge control agent may be mixed so that their charge performance can be stabilized. In that instance, it is preferred to use a colorless or pale-colored charge control agent that does not affect the color tone of the colorant-containing resin particles. A negative charge control agent may include organic metal complexes as exemplified by a metal complex of an alkyl-substituted salicylic acid, e.g., a chromium complex or zinc complex of di-tert-butylsalicylic acid. In the case when the negative charge control agent is mixed in the colorant-containing resin particles, it should be added in an amount of from 0.1 to 10 parts by weight, and preferably from 0.5 to 8 parts by weight, based on 100 parts by weight of the binder resin.

In the case when the toner of the present invention and a carrier are blended to prepare a two-component developer, they may be blended in such a proportion that the toner is in a concentration of from 2 to 12% by weight, and preferably from 3 to 9% by weight, in the developer. A toner concentration less than 2% by weight tends to cause a lowering of image density, and that more than 12% by weight tends to cause an increase in fogging or in-machine toner scatter to shorten the service life of the developer.

As the colorant used in the present invention, it is possible to use, for a non-magnetic toner, any known dyes and pigments as exemplified by Phthalocyanine Blue, Indanthrene Blue, Peacock Blue, Permanent Red, Lake Red, Rhodamin Lake, Hanza Yellow, Permanent Yellow and Benzidine Yellow. They may be contained in an amount of not more than 12 parts by weight, and preferably from 0.5 to 9 parts by weight, based on 100 parts by weight of a binder resin in order to ensure a sensitive reflection with respect to light transmission properties of OHP films. A magnetic material may also be used to give a magnetic toner.

The toner of the present invention may be optionally incorporated with additives so long as the properties of the toner are not damaged. Such additives may include, for example, charging aids such as organic resin particles and metal oxides, lubricants such as Teflon, zinc stearate and polyvinylidene fluoride, or fixing aids as exemplified by a low-molecular weight polyethylene and a low-molecular weight polypropylene.

In preparing the colorant-containing resin particles and toner of the present invention, it is possible to apply a method in which component materials are well kneaded by means of a heat-kneading machine such as a heat roll, a kneader or an extruder, thereafter the kneaded product is pulverized by a mechanical means, and then the pulverized powder is classified to give a toner; a method in which materials such as colorants are dispersed in a binder resin solution, followed by spray drying to give a toner; and a method of preparing a toner by suspension polymerization, comprising mixing given materials with binder resin constituent polymerizable monomers to form a monomer composition, and subjecting an emulsion suspension of this composition to polymerization.

As a binder material used in the colorant-containing resin particles, various material resins conventionally known as toner binder resins for electrophotography can be used.

For example, they may include polystyrene, styrene copolymers such as a styrene/butadiene copolymer, a styrene/acrylate copolymer and a styrene/methacrylate copolymer, polyethylene polymers, ethylene copolymers such as an ethylene/vinyl acetate copolymer and an ethylene/vinyl alcohol copolymer, phenol resins, epoxy resins, acrylphthalate resins, polyamide resins, polyester resins, and maleic acid resins. Regarding all the resins, there are no particular limitations on their preparation.

Of these resins, the effect of the present invention can be greatest particularly when polyester resins are used, which have a high negative chargeability. The polyester resins can achieve excellent fixing performance, and are suited for binder resins of color toners. Although the polyester resins on the other hand have a strong negative chargeability and tend to give an excess quantity of triboelectricity, the problems involved in the polyester resins are resolved and a superior toner can be obtained, when the polyester resins are used in the colorant-containing resin particles according to the toner of the present invention.

In particular, the following polyester resin is preferred because of its sharp melt properties, which is a polyester resin obtained by condensation polymerization of i) a diol component comprised of a bisphenol derivative or substituted bisphenol represented by the formula:

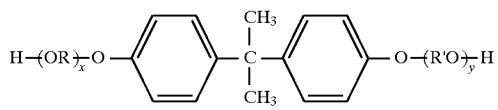

wherein R and R' represent an ethylene group or a propylene group, and x and y each represent an integer of 1 or more, where x+y is 2 to 10 on the average and ii) a carboxylic acid component comprising a dibasic or more basic carboxylic acid, its acid anhydride or its lower alkyl ester, as exemplified by fumaric acid, maleic acid, maleic anhydride, phthalic acid, terephthalic acid, trimellitic acid and pyromellitic acid.

In the case when the toner of the present invention and the carrier are blended and used as a two-component developer, an electrically insulative resin may preferably be used as a resin with which carrier particle surfaces are coated, which may be appropriately selected from toner materals and/or carrier core materials. In the present invention, in order to improve adhesion to the surfaces of carrier core materials, it is preferred to use as a coating resin at least a resin comprised of at least one monomer selected from acrylic acid (or its esters) monomers and methacrylic acid (or its esters) monomers. In particular, when the colorant-containing resin particles using as a toner material the polyester resin having a high negative chargeability, the coating resin may preferably be comprised of a copolymer of styrene monomers. The styrene monomers may preferably made to have a copolymerization weight ratio of from 5 to 70% by weight.

As the monomers usable in the present invention for the carrier core coating resin, styrene monomers may include styrene monomers, chlorostyrene monomers, α-methylstyrene monomers and styrene-chlorostyrene monomers; acrylic monomers may include acrylate monomers such as a methyl acrylate monomer, an ethyl acrylate monomer, a butyl acrylate monomer, an octyl acrylate monomer, a phenyl acrylate monomer and a 2-ethylhexyl acrylate monomer; and methacrylate monomers such as a methyl methacrylate monomer, an ethyl methacrylate monomer, a butyl methacrylate monomer and a phenyl methacrylate monomer.

As the carrier core material used in the present invention, it is possible to use, for example, surface-oxidized or -unoxidized particles of metals such as iron, nickel, copper, zinc, cobalt, manganese, chromium and rare earth elements, or alloys or oxides of any of these, and ferrites. There are no particular limitations on the method of preparing them.

An example of an image forming apparatus used when non-magnetic one-component toner development is carried out using the toner of the present invention will be described below. The example is by no means limited to this. FIG. 1 illustrates an apparatus for developing an electrostatic image formed on a latent image bearing member. On a latent image bearing member 1, a latent image is formed through an electrophotographic process means or electrostatic recording means (not shown). A developer carrying member 2 is comprised of a non-magnetic sleeve made of aluminum, stainless steel or the like. The non-magnetic one-component color toner is reserved in a hopper 3, and fed onto the developer carrying member 2 by means of a feed roller 4. The feed roller 4 also takes off the toner remaining on the developer carrying member 2 after development. The toner fed onto the developer carrying member 2 is coated in a uniform and thin layer by means of a developer coating blade 5. It is effective for the developer coating blade 5 and the developer carrying member 2 to be brought into contact at a contact pressure of from 3 to 250 g/cm, and preferably from 10 to 120 g/cm, as a linear pressure in the mother line direction of the sleeve. A contact pressure smaller than 3 g/cm tends to make it difficult for the toner to be uniformly coated and tends to result in a broad distribution of charges of the toner to cause fogging or toner scatter. A contact pressure larger than 250 g/cm is not preferable since the toner tends to undergo agglomeration of particles or pulverization because of a large pressure applied to the toner. The adjustment of the contact pressure in the range of 3 g/cm to 250 g/cm makes it possible to disintegrate the agglomeration peculiar to toners with small particle diameter, and makes it possible to instantaneously raise the quantity of triboelectricity of the toner. As the developer coating blade 5, it is preferred to use a blade made of a material of a triboelectric series suited for the toner to be electrostatically charged in the desired polarity.

In the present invention, silicone rubber, urethane rubber, styrene-butadiene rubber, etc. are preferred. Use of a conductive rubber is preferable since the toner can be prevented from being charged in excess. The surface of the blade 5 may optionally further provided with a coating. In particular, when the toner is used as a negative toner, it is preferable for the surface to be coated with a positively chargeable resin such as polyamide resin.

In the system in which the toner is coated in a thin layer onto the developer carrying member 2 by means of the blade 5, in order to obtain a sufficient image density, the thickness of the toner layer formed on the developer carrying member 2 may preferably be made smaller than the length of clearance at which the developer carrying member 2 and the latent image bearing member 1 are opposed, and an alternating electric field is applied to this clearance. Using a bias electric source 6 as shown in FIG. 1, an alternating electric field, or a developing bias comprised of an alternating electric field and a direct-current electric field overlaid thereon, is applied across the developer carrying member 2 and the latent image bearing member 1, whereby the toner can be moved with ease from the surface of the developer carrying member 2 to the surface of the latent image bearing member 1 and also an image with a good quality can be obtained.

Methods of measurement of the respective physical properties in the present invention will be described below.

(1) Measurement of quantity of triboelectricity

Figure 2:
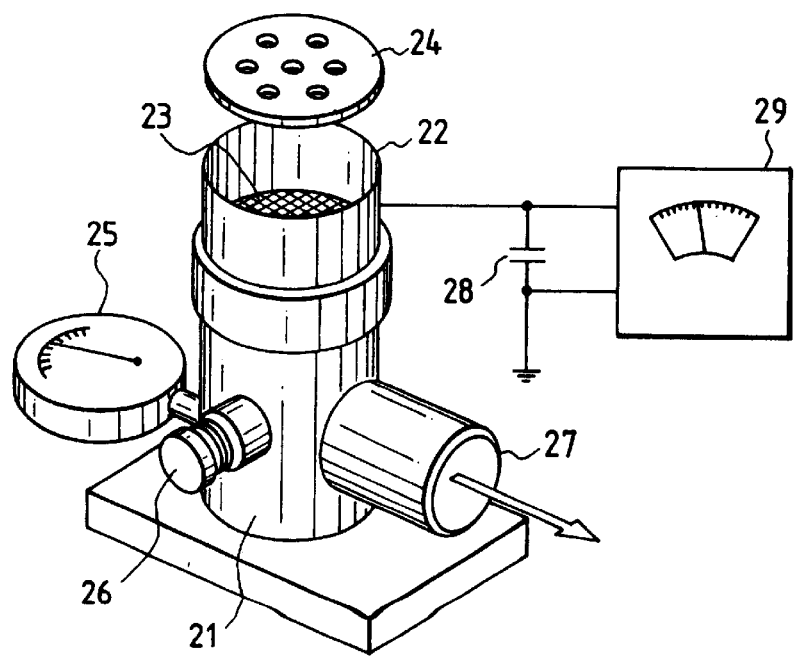
FIG. 2 illustrates an apparatus for measuring the quantity of triboelectricity of a toner or a finely powdered sample.

FIG. 2 illustrates an apparatus for measuring the quantity of triboelectricity. First, a mixture of i) the colorant-containing resin particles or toner the quantity of triboelectricity of which is to be measured and ii) iron powder, mixed in a proportion of 1:19 in weight ratio (or a mixture of 1:99 in the case of the external additive), which are put in a bottle with a volume of 50 to 100 ml, made of polyethylene, and manually shaken for about 10 to 40 seconds. The resulting mixture is put in a measuring container 22 made of a metal at the bottom of which a conductive screen 23 of 500 meshes is provided, and the container is covered with a plate 24 made of a metal. The total weight of the measuring container 22 in this state is weighed and is expressed as $W_1$ (g). Next, in a suction device 21 (made of an insulating material at least at the apart coming into contact with the measuring container 22), air is exhausted from a suction opening 27 and an air-flow control valve 26 is operated to control the pressure indicated by a vacuum indicator 25 to be 250 mmHg. In this state, suction is sufficiently carried out (preferably for about 2 minutes) to remove the toner by suction. The potential indicated by a potentiometer 29 at this time is expressed as V (volt). Herein, the numeral 28 denotes a capacitor, whose capacitance is expressed as C ($\mu$F). The total weight of the measuring container after completion of the suction is also weighed and is expressed as $W_2$ (g). The quantity of triboelectricity ($\mu$c/g) of the toner is calculated as shown by the following expression. Quantity of triboelectricity of the sample ($\mu$c/g)

$$= \frac{C \times V}{W_1 - W_2}$$

(Measurement is carried out under conditions of 23° C. and 60% RH.)

(2) Measurement of toner particle size

The particle size distribution can be measured by various methods. In the present invention, it is measured using a Coulter counter.

A Coulter counter Type TA-II (manufactured by Coulter Electronics, Inc.) is used as a measuring device. An interface (manufactured by Nikkaki k.k.) that outputs number average distribution and volume distribution and a personal computer CX-1 (manufactured by Canon Inc.) are connected. As an electrolytic solution, an aqueous 1% NaCl solution is prepared using first-grade sodium chloride. Measurement is carried out by adding as a dispersant from 0.1 to 5 ml of a surface active agent, preferably an alkylbenzene sulfonate, to from 100 to 150 ml of the above aqueous electrolytic solution, and further adding from 2 to 20 mg of a sample to be measured. The electrolytic solution in which the sample has been suspended is subjected to dispersion for about 1 minute to about 3 minutes in an ultrasonic dispersion machine. The volume distribution and number distribution of particles of 2 $\mu$m to 40 $\mu$m are calculated by measuring the volume and number of the colorant-containing resin particles or toner particles by means of the above Coulter counter Type TA-II, using an aperture of 100 $\mu$m as its apertures. Then the values according to the present invention are determined, which are the weight-based, weight average particle diameter D4 determined from the volume distribution (where the middle value of each channel is used as the representative value for each channel), the weight-based, coarse-powder content (16.0 $\mu$m or larger) determined from the volume distribution, and the number-based, fine-powder particle number (5.04 $\mu$m or smaller) determined from the number distribution.

(3) Measurement of degree of agglomeration

As a means for measuring the fluidity of a sample or the toner having the external additives, a method for measuring the degree of agglomeration is used. The larger the value of the degree of agglomeration is, the poorer the fluidity of the sample is judged to be.

As a measuring apparatus, Powder Tester (trade name; manufactured by Hosokawa Micron Corporation) is used.

To make the measurement, 200 mesh, 100 mesh and 60 mesh sieves are overlaid one another on a vibrating pedestal in order of mesh of smaller openings, i.e, in order of 200 mesh, 100 mesh and 60 mesh sieves so that the 60 mesh sieve is uppermost.

On the 60 mesh sieve of the sieves set in this way, a sample precisely weighed in an amount of 5 g is placed, the input voltage applied to the vibrating pedestal is set to 21.7 V, and the vibrational amplitude of the vibrating pedestal is so adjusted as to be within the range of 60μ to 90μ (rheostat gauge: about 2.5), where the sieves are vibrated for about 15 seconds. The weight of the sample that remained on each sieve is measured to calculate the degree of agglomeration according to the following expression:

Degree of agglomeration (%)=Sample weight on 60 mesh sieve/5 g×100+Sample weight on 100 mesh sieve/5 g×100×⅗+Sample weight on 200 mesh sieve/5 g×100×⅕

The same used is a sample having been left to stand in an environment of 23° C. and 60% RH for about 12 hours. Measurement is made in an environment of 23° C. and 60% RH.

(4) Measurement of bulk (apparent) density

Apparent density is measured using a Powder Tester (trade name; manufactured by Hosokawa Micron Corporation). To make the measurement, a 60 mesh sieve is set on a vibrating pedestal, and an apparent density measuring cup (internal volume: 100 cc) the weight of which has been measured is placed right beneath the sieve.

Next, graduation of a rheostat is adjusted to 2.0 and then vibration is started. A sample for the measurement is allowed to gently flow out from the upper part of the vibrating 60 mesh sieve so as to enter into the measuring cup.

After the cup has been filled with the sample in a heap, the vibration is stopped. The heap of the sample is leveled using a blade at the top of the cup, and the sample remaining in the cup is precisely weighed using a chemical balance.

Since the measuring cup has an internal volume of 100 cc, the apparent density (g/cm$^3$) can be determined by dividing the weight of sample by 100.

The sample used is a sample having been left to stand in an environment of 23° C. and 60% RH for about 12 hours. Measurement is made in an environment of 23° C. and 60% RH.

(5) Measurement of hydrophobicity

Methanol titration is an experimental means for ascertaining the hydrophobicity of an inorganic fine particles whose surfaces have been made hydrophobic.

0.2 g of inorganic fine particles (e.g. fine titanium oxide particles) to be tested is added to 50 ml of water contained in an Erlenmeyer flask with a volume of 250 ml. Methanol is dropwise added from a buret until the whole of the inorganic fine powder has been swelled. Here, the solution inside the flask is continually stirred with magnetic stirrer. The end point can be observed upon suspension of the whole inorganic fine particles in the solution. The hydrophobicity is expressed as a percentage of the methanol present in the liquid mixture of methanol and water when the reaction has reached the end point.

EXAMPLES

The present invention will be described below in greater detail by giving Preparation Examples of the fine titanium oxide particles, Examples of the present invention and Comparative Examples. In the following, "part(s)" refers to "part(s) by weight".

Fine Titanium Oxide Particles Preparation

Example 1 (Present Invention)

Titanium tetraisopropoxide was used as a starting material. Using a chemical pump and using nitrogen gas as a carrier gas, the starting material was fed little by little to glass wool of a vaporizer heated to 200° C. to effect vaporization, and thermally decomposed in a reaction vessel at a temperature of 320° C. Immediately thereafter, using nitrogen gas as a carrier gas, the powder was made hydrophobic using hexamethyldisilazane gas and at the same time rapidly cooled, followed by collection of the product to give spherical fine titanium oxide particles I having a quantity of triboelectricity of −20 μc/g, an average primary particle diameter of 20 mμ, a BET specific surface area of 130 m$^2$/g, a hydrophobicity of 70% and a carbon content of 7% by weight. Analysis by X-ray diffraction confirmed that this fine titanium oxide particles were amorphous.

Fine Titanium Oxide Particles Preparation

Example 2 (Present Invention)

Preparation Example 1 was repeated except that hexamethyldisilazane was replaced with methyltriethoxysilane, to give amorphous, spherical fine titanium oxide particles II having a quantity of triboelectricity of −17 μc/g, an average primary particle diameter of 20 mμ, a BET specific surface area of 120 m$^2$/g, a hydrophobicity of 65% and a carbon content of 6% by weight.

Fine Titanium Oxide Particles Preparation

Example 3 (Present Invention)

Preparation Example 1 was repeated except that titanium tetraisopropoxide was replaced with titanium tetranormalpropoxide, the temperature of the vaporizer was changed to 220° C. and the temperature of the reaction vessel to 270° C., to give amorphous, spherical fine titanium oxide particles III having a quantity of triboelectricity of −19 μc/g, an average primary particle diameter of 32 mμ, a BET specific surface area of 100 m$^2$/g, a hydrophobicity of 70% and a carbon content of 5.5% by weight.

Fine Titanium Oxide Particles Preparation

Example 4 (Present Invention)

Preparation Example 1 was repeated except that hexamethyldisilazane was not used, to give amorphous, spherical fine titanium oxide particles IV having a quantity of triboelectricity of 0 μc/g, an average primary particle diameter of 20 mμ, a BET specific surface area of 150 m$^2$/g, a hydrophobicity of 0% and a carbon content of 0.2% by weight.

Fine Titanium Oxide Particles Preparation

Example 5 (Comparative Example)

Preparation Example 1 was repeated except that the thermal decomposition was carried out at a temperature of 800° C., to give fine titanium oxide particles V having a quantity of triboelectricity of −33 μc/g, an average primary particle diameter of 20 mμ, a BET specific surface area of 75 m$^2$/g, a hydrophobicity of 80% and a carbon content of 4.5% by weight.

Fine Titanium Oxide Particles Preparation

Example 6 (Comparative Example)

Preparation Example 1 was repeated except that no rapid cooling was carried out after the thermal decomposition, to give amorphous, spherical titanium oxide VI having a quantity of triboelectricity of −24 μc/g, an average primary particle diameter of 25 mμ, a BET specific surface area of 120 m$^2$/g, a hydrophobicity of 70% and a carbon content of 6.5% by weight.

Fine Titanium Oxide Particles Preparation

Example 7 (Comparative Example)

Titanium tetrachloride was thermally decomposed at 800° C. in a gaseous phase, to give titanium oxide VII having a quantity of triboelectricity of 0 μc/g, an average primary particle diameter of 25 mμ, a BET specific surface area of 80 m$^2$/g and a hydrophobicity of 0%.

Fine Titanium Oxide Particles Preparation

Example 8 (Comparative Example)

Spherical titanium oxide VII was made hydrophobic using hexamethyldisilazane in a gaseous phase, to give spherical titanium oxide VIII having a quantity of triboelectricity of 12 μc/g, an average primary particle diameter of 25 mμ, a BET specific surface area of 70 m$^2$/g, a hydrophobicity of 50% and a carbon content of 3.8% by weight.

Fine Titanium Oxide Particles Preparation

Example 9 (Comparative Example)

Preparation was carried out by the sulfate process wherein after neutralization in an aqueous titanium sulfate the precipitate produced was fired, to give rutile type titanium oxide IX having a quantity of triboelectricity of −25 μc/g, an average primary particle diameter of 200 mμ and a BET specific surface area of 50 m$^2$/g.

Example 1

Polyester resin obtained by condensation of propoxylated bisphenol and fumaric acid 100 parts Phthalocyanine pigment 4 parts Chromium complex of di-tert-butylsalicylic acid 4 parts The above materials were preliminarily thoroughly mixed using a Henschel mixer, and then melt-kneaded using a twin-screw extruder. After cooling, the kneaded product was crushed using a hammer mill to give coarse particles of about 1 to 2 mm in diameter, which were then finely pulverized using a fine grinding mill of an air-jet system. The resulting finely pulverized product was classified to give colorant-containing resin particles with a weight average particle diameter of about 8 μm (quantity of triboelectricity: −20.5 μc/g).

This colorant-containing resin particles and 0.5% by weight of fine titanium oxide particles I of Preparation Example 1 were blended using a Henschel Mixer to give a cyan toner. This cyan toner had a weight average particle diameter of 7.9μ. The fine titanium oxide particles had an average particle diameter of 36 mμ for those present on the colorant-containing resin particles.

Next, 95 parts of a coated ferrite carrier comprised of Cu—Zn—Fe ferrite carrier cores having a weight average particle diameter of 45 μm (particle size distribution: particles with particle diameters less than 35μ, 4.2% by weight; particles with particle diameters of 35 to 40μ, 9.5% by weight; and particles with particle diameters not smaller than 74 μm, 0.2% by weight), coated with 0.5% by weight of a copolymer comprised of 80% by weight of styrene and 20% by weight of methyl methacrylate (number average molecular weight: 35,000; weight average molecular weight: 76,000), and 5 parts of the cyan toner were blended to give a developer.

This developer was applied in a commercially available plain-paper color copier (Color Laser Copier 500, manufactured by Canon Inc.), and an image was reproduced in an environment of 23° C. and 65% RH, setting development contrast at 300 V. On the image thus obtained, reflection density was measured with Macbeth Densitometer RD918 Type using an SPI filter (hereinafter the image density was measured by the same method). The image was in a density of as high as 1.49, free from fog, and sharp. Copies were thereafter further taken on 10,000 sheets, during which density decreased by as small as 0.09 and the same fog-free, sharp images as those at the initial stage were obtained. In an environment of low temperature and low humidity (20° C., 10% RH), images were reproduced setting the development contrast at 300 V. As as result, image density was as high as 1.45, and the quantity of triboelectricity in an environment of low humidity was effectively controlled.

The cyan toner image was transferred to an OHP film and then fixed. The film was set on an overhead projector and light was passed through it. As a result, a sharp cyan color image was projected on the screen.

In an environment of high temperature and high humidity (30° C., 80% RH), images were also reproduced setting the development contrast at 300 V. As as result, image density was 1.52, and very stable and good images were obtained.

Initial images reproduced after the developer was left to stand for 1 month in each environment of 23° C./60% RH, 20° C./10% RH and 30° C./80% RH, also showed no undesirable changes.

Table 1 shows physical properties of the toner, and Table 2, its quantity of triboelectricity and image characteristics. (The same applied hereinafter.)

Examples 2 & 3

Toners and developers were prepared in the same manner as in Example 1 except for using fine titanium oxide particles II and III, respectively. Tests were carried out in the same manner as in Example 1 to obtain good results.

Example 4

A toner and a developer were prepared in the same manner as in Example 1 except for using fine titanium oxide particles IV. Tests were carried out in an environment of high temperature and high humidity (30° C., 80% RH). As a result, image density was slightly higher than that in Example 1, lacking in stability, but there was no problem at all in practical use.

Comparative Example 1

A toner and a developer were prepared in the same manner as in Example 1 except for using fine titanium oxide particles V. As a result, the average particle diameter thereof on the colorant-containing resin particles was as large as 100 mμ, and the toner had a degree of agglomeration of as large as 19%. In image reproduction tests, image deterioration occurred.

Comparative Example 2

A toner and a developer were prepared in the same manner as in Comparative Example 1 except for using the fine titanium oxide particles V in an amount of 15% by weight. As a result, the degree of agglomeration of the toner decreased to 5.2%, but the quantity of triboelectricity of the toner was so low that toner scatter occurred.

Comparative Example 3

Example 1 was repeated except for using fine titanium oxide particles VI. As a result, the average particle diameter thereof on the colorant-containing resin particles was as large as 90 m$\mu$, and image deterioration occurred.

Comparative Example 4

Example 1 was repeated except that the fine titanium oxide particles I was replaced with a fine silica powder having been treated with dimethyldichlorosilane (average primary particle diameter: 10 m$\mu$; BET specific surface area: 220 m$^2$/g; hydrophobicity: 70%). As a result, charges in the environment of 20° C./10% RH became excessive to cause a lowering of image density.

Comparative Examples 5 to 7

Example 1 was repeated except for using fine titanium oxide particles VI to IX, respectively. As a result, image deterioration occurred.

Example 5

Images were reproduced in the same manner as in Example 1 except that the developing assembly of the commercially available plain-paper color copier (Color Laser Copier 500, manufactured by Canon Inc.) was modified as shown in FIG. 1 and the toner only was used without use of the carrier. As a result, good results were obtained.

Here, the toner coating blade used was a urethane elastic blade coated thereon with polyamide resin.

TABLE 1

| External additive | (wt. %) | (1) (m$\mu$) | (2) (%) | (3) (g/cm$^3$) |
|---|---|---|---|---|
| Example: | | | | |
| 1 Fine titanium oxide particles | I (0.5) | 36 | 3.2 | 0.42 |
| 2 Fine titanium oxide particles | II (0.5) | 40 | 3.8 | 0.45 |
| 3 Fine titanium oxide particles | III (0.5) | 60 | 4.5 | 0.48 |
| 4 Fine titanium oxide particles | IV (0.5) | 34 | 3.5 | 0.45 |
| 5 Fine titanium oxide particles | I (0.5) | 36 | 3.2 | 0.42 |
| Comparative Example: | | | | |
| 1 Fine titanium oxide particles | V (0.5) | 100 | 19.0 | 0.53 |
| 2 Fine titanium oxide particles | V (1.5) | 100 | 5.2 | 0.48 |
| 3 Fine titanium oxide particles | VI (0.5) | 90 | 14.1 | 0.51 |
| 4 Fine silica powder | (0.5) | 25 | 3.1 | 0.41 |
| 5 Fine titanium oxide particles | VII (0.5) | 120 | 18.3 | 0.50 |
| 6 Fine titanium oxide particles | VIII (0.5) | 130 | 19.7 | 0.52 |
| 7 Fine titanium oxide particles | IX (0.5) | 300 | 20.2 | 0.54 |

(1): Average particle diameter on colorant-containing resin particles
(2): Degree of agglomeration of toner
(3): Bulk density of toner

TABLE 2

| | Quantity of triboelectricity of toner | | | Image density | | | Image quality | | Durability |
|---|---|---|---|---|---|---|---|---|---|
| | 20° C./10% RH | 23° C./65% RH | 30° C./80% RH | 20° C./ 10% RH | 23° C./ 65% RH | 30° C./ 80% RH | (1) | (2) | Toner scatter |
| Example: | | | | | | | | | |
| 1 | −27.1 | −26.3 | −24.0 | 1.45 | 1.47 | 1.52 | AA | AA | AA |
| 2 | −28.3 | −27.5 | −27.0 | 1.43 | 1.45 | 1.46 | AA | A | AA |
| 3 | −26.3 | −25.4 | −25.0 | 1.47 | 1.49 | 1.51 | A | AA | AA |
| 4 | −26.5 | −25.2 | −23.1 | 1.46 | 1.50 | 1.59 | AA | A | AA |
| 5 | — | — | — | 1.47 | 1.50 | 1.54 | A | A | A |
| Comparative Example: | | | | | | | | | |
| 1 | −26.3 | −25.5 | −22.1 | — | 1.48 | — | B | B | — |
| 2 | −21.2 | −18.6 | −15.3 | — | 1.62 | — | A | A | C |
| 3 | −25.2 | −24.7 | −23.2 | — | 1.53 | — | B | AB | — |
| 4 | −35.1 | −30.3 | −25.1 | 1.21 | 1.40 | — | A | A | — |
| 5 | −25.2 | −23.1 | −16.5 | — | 1.57 | — | B | B | — |
| 6 | −27.3 | −25.0 | −23.4 | — | 1.51 | — | B | BC | — |
| 7 | — | −27.2 | — | — | 1.45 | — | C | C | — |

(1): Fine-line reproduction
(2): Solid image uniformity
Evaluation: AA: Excellent; A: Good; AB: Relatively good; B: Passable; BC: Relatively poor; C: Poor

Example 6

| | |
|---|---|
| Polyester resin obtained by condensation of propoxylated bisphenol and fumaric acid | 100 parts |
| C.I. Pigment Yellow 17 | 3.5 parts |
| Chromium complex of di-tert-butylsalicylic acid | 4 parts |

Using the above materials, colorant-containing resin particles with a weight average particle diameter of about $8\mu$ (quantity of triboelectricity: $-22.7\ \mu c/g$) were obtained in the same manner as in Example 1. Next, 99.5 parts of the resulting colorant-containing resin particles and 0.5 part of fine titanium oxide particles I were blended to give a yellow toner. This yellow toner had a weight average particle diameter of $7.9\mu$. The fine titanium oxide particles had an average particle diameter of 37 m$\mu$ for those present on the colorant-containing resin particles. The yellow toner had a degree of agglomeration of 3.3% and a bulk density of 0.43 g/cm$^3$.

Next, in the same manner as in Example 1, 5 parts of the yellow toner and 95 parts of the coated ferrite carrier were blended to give a two-component developer. Images were reproduced in the same manner as in Example 1 to obtain a good yellow toner image.

The yellow toner image was transferred to an OHP film and then fixed. The film was set on an overhead projector and light was passed through it. As a result, a sharp yellow color image was projected on the screen.

Example 7

| | |
|---|---|
| Polyester resin obtained by condensation of propoxylated bisphenol and fumaric acid | 100 parts |
| Rhodamine Pigment | 4 parts |
| Chromium complex of di-tert-butylsalicylic acid | 4 parts |

Using the above materials, colorant-containing resin particles with a weight average particle diameter of about $8\mu$ (quantity of triboelectricity: $-21.3\ \mu c/g$) were obtained in the same manner as in Example 1. Next, 99.5 parts of the resulting colorant-containing resin particles and 0.5 part of fine titanium oxide particles I were blended to give a magenta toner. This magenta toner had a weight average particle diameter of $7.9\mu$. The fine titanium oxide particles had an average particle diameter of 35 m$\mu$ for those present on the colorant-containing resin particles. The magenta toner had a degree of agglomeration of 3.1% and a bulk density of 0.42 g/cm$^3$.

Next, in the same manner as in Example 1, 5 parts of the magenta toner and 95 parts of the coated ferrite carrier were blended to give a two-component developer. Images were reproduced in the same manner as in Example 1 to obtain a good magenta toner image.

The magenta toner image was transferred to an OHP film and then fixed. The film was set on an overhead projector and light was passed through it. As a result, a sharp magenta color image was projected on the screen.

Example 8

Using the cyan toner-containing two-component developer prepared in Example 1, the yellow toner-scontaining two-component developer prepared in Example 6 and the magenta toner-containing two-component developer prepared in Example 7, full-color image reproduction was tested using the plain-paper color copier (Color Laser Copier 500, manufactured by Canon Inc.). As a result, a good full-color image was obtained, and the respective colors were mixed in a good state.

The full-color toner image was transferred to an OHP film and then fixed. The film having the full-color image thus formed was set on an overhead projector and light was passed through it. As a result, a sharp full-color image was projected on the screen.

According to the present invention, the external additive fine titanium oxide particles are improved, in particular, a volatile titanium compound is subjected to gaseous-phase thermal decomposition at a relatively low temperature, followed by rapid cooling and at the same time hydrophobic treatment. With use of the product thus obtained, the toner can have a stabilized charge performance in various environments and also show a good fluidity.

Fine Titanium Oxide Particles Preparation

Example 10

Titanium tetraisopropoxide was used as a starting material. Using a chemical pump, the starting material was fed little by little to glass wool of a vaporizer heated to 200° C. to effect vaporization, and the vaporized material was introduced into a reaction vessel and a cooling pipe subsequently provided. Upon thermal decomposition carried out at a temperature of 350° C., the product adhered to the cooling pipe. Thereafter, the product adhering to the cooling pipe was collected to obtain fine titanium oxide particles. Here, in the feeding of the starting material, helium was used as a carrier gas, and fine titanium oxide particles were previously kept adhered to the inner wall of the reaction vessel.

The fine titanium oxide particles thus obtained were observed with a transmission type electron microscope, and diameters of 100 particles present in the visual field were measured to determine their average particle diameter, to reveal that it was 25 m$\mu$. Analysis by X-ray diffraction confirmed that the particles were amorphous. The fine titanium oxide particles had a quantity of triboelectricity of 0 $\mu c/g$.

Fine Titanium Oxide Particles Preparation

Example 11

Fine titanium oxide particles were obtained in the same manner as in Preparation Example 10 except that titanium tetranormalpropoxide was used as the starting material, the temperature of the vaporizer was changed to 220° C. and the temperature of the reaction vessel to 280° C.

The fine titanium oxide particles thus obtained were observed with a transmission type electron microscope, and their average particle diameter was determined in the same manner as in Preparation Example 10, to reveal that it was 35 m$\mu$. Analysis by X-ray diffraction confirmed that the particles were amorphous. The fine titanium oxide particles had a quantity of triboelectricity of 0 $\mu c/g$.

Example 9

Polyester resin obtained by condensation of

| | |
|---|---|
| propoxylated bisphenol and fumaric acid | 100 parts |
| Phthalocyanine pigment | 4 parts |
| Chromium complex of di-tert-butylsalicylic acid | 4 parts |

The above materials were preliminarily thoroughly mixed using a Henschel mixer, and then melt-kneaded at least twice using a three-roll mill. After cooled, the kneaded product was crushed using a hammer mill to give coarse particles of about 1 to 2 mm in diameter, which were then finely pulverized using a fine grinding mill of an air-jet system. The resulting finely pulverized product was classified to give colorant-containing resin particles (quantity of triboelectricity: −22.4 μc/g).

This colorant-containing resin particles and, based thereon, 0.7% by weight of fine titanium oxide particles of Preparation Example 10 and 0.3% by weight of acrylic reverse-polarity resin particles with a particle diameter of 50 mμ in were blended using a Henschel Mixer to give a cyan toner. This cyan toner had a weight average particle diameter of 7.9μ.

Next, 95 parts of a coated ferrite carrier comprised of Cu—Zn—Fe ferrite carrier cores having a weight average particle diameter of 45 μm (particle size distribution: particles with particle diameters less than 35μ, 4.2% by weight; particles with particle diameters of 35 to 40μ, 9.5% by weight; and particles with particle diameters not smaller than 74 μm, 0.2% by weight), coated with 0.5% by weight of a copolymer comprised of 50% by weight of styrene component, 20% by weight of methyl methacrylate component and 30% by weight of 2-ethylhexyl acrylate component (number average molecular weight: 21,250; weight average molecular weight: 52,360), and 5 parts of the cyan toner were blended to give a developer.

This developer was applied in a commercially available plain-paper color copier (Color Laser Copier 500, manufactured by Canon Inc.), and an image was reproduced in an environment of 23° C./65% RH, setting development contrast at 300 V. On the image thus obtained, reflection density was measured with Macbeth Densitometer RD918 Type using an SPI filter (hereinafter the image density was measured by the same method). This image was in a density of as high as 1.49 , free from fog, and sharp. Copies were thereafter further taken on 10,000 sheets, during which density decreased by as small as 0.09 and the same fog-free, sharp images as those at the initial stage were obtained. In an environment of low temperature and low humidity (20° C., 10% RH), images were reproduced setting the development contrast at 300 V. As as result, image density was as high as 1.45, and the quantity of triboelectricity in an environment of low humidity was effectively controlled.

In an environment of high temperature and high humidity (30° C., 80% RH), images were also reproduced setting the development contrast at 300 V. As a result, image density was 1.56, and very stable and good images were obtained.

Initial images reproduced after the developer was left to stand for 1 month in each environment of 23° C./60% RH, 20° C./10% RH and 30° C./80% RH, also showed no undesirable changes.

Example 10

Images were reproduced in the same manner as in Example 9 except that the fine titanium oxide particles of Preparation Example 11 were used as the external additive. Image densities obtained were 1.44 to 1.53 in the environment of 20° C./10% RH, 1.47 to 1.55 in the environment of 23° C./65% RH, and 1.50 to 1.57 in the environment of 30° C./80% RH, giving good results.

Example 11

Images were reproduced in the same manner as in Example 9 except that the developing assembly of the commercially available plain-paper color copier (Color Laser Copier 500, manufactured by Canon Inc.) was modified as shown in FIG. 1 and no carrier was used. Image densities obtained were 1.46 to 1.53 in the environment of 20° C./10% RH, 1.50 to 1.58 in the environment of 23° C./65% RH, and 1.56 to 1.60 in the environment of 30° C./80% RH, giving good results.

Example 12

Images were reproduced in the same manner as in Example 9 except that fine titanium oxide particles (quantity of triboelectricity: −18.7 μc/g) obtained by subjecting the titanium oxide of Preparation Example 10 to hydrophobic treatment with titanium coupling agent to have a hydrophobicity of 22% were used as the external additive. Image densities obtained were 1.40 to 1.46 in the environment of 20° C./10% RH, 1.41 to 1.47 in the environment of 23° C./65% RH, and 1.50 to 1.57 in the environment of 30° C./80% RH, giving good results without damaging the performance in the environment of low humidity.

Example 13

Images were reproduced in the same manner as in Example 9 except that the reverse-polarity resin particles (quantity of triboelectricity: +60 μc/g) with a particle diameter of 50 mμ were not used as the external additive. Image densities obtained were 1.37 to 1.42 in the environment of 20° C./10% RH, 1.42 to 1.53 in the environment of 23° C./65% RH, and 1.50 to 1.58 in the environment of 30° C./80% RH, giving good results although the image density in the environment of low humidity was slightly lowered compared with that in Example 9.

Comparative Example 8

Images were reproduced in the same manner as in Example 9 except that the external additive the fine titanium oxide particles of Preparation Example 10 was replaced with rutile type fine titanium oxide particles having a particle diameter of 500 mμ (quantity of triboelectricity: 0 μc/g) prepared by the sulfate process wherein after neutralization in an aqueous titanium sulfate the precipitate produced was fired. In the environment of 30° C./80% RH, image density increased because of insufficiency of the quantity of triboelectricity after copying on 500th sheet and toner scatter occurred after copying on about 3,000th sheet.

Comparative Example 9

Images were reproduced in the same manner as in Example 9 except that the external additive the fine titanium oxide particles of Preparation Example 10 was replaced with fine silica powder treated with dimethydichlorosilane (BET surface specific area: 170 m²/g; quantity of triboelectricity: −42.5 μc/g). Image densities obtained were 1.25 to 1.30 in the environment of 20° C./10% RH, 1.43 to 1.51 in the environment of 23° C./65% RH, and 1.49 to 1.55 in the environment of 30° C./80% RH, showing a lowering of environmental stability compared with that in Example 9.

Comparative Example 10

Images were reproduced in the same manner as in Example 9 except that the titanium oxide was not used in Example 9. Fluidity was so insufficient that the image quality was greatly lowered from the initial stage.

Comparative Example 11

Images were reproduced in the same manner as in Example 9 except that anatase type titanium oxide having a particle diameter of 300 mµ (quantity of triboelectricity: −1.3 µc/g) obtained by firing at a high temperature (800° C.) the fine titanium oxide particles of Preparation Example 10 was used as the external additive. Image densities obtained were 1.19 to 1.29 in the environment of 20° C./10% RH, 1.40 to 1.52 in the environment of 23° C./65% RH, and 1.48 to 1.59 in the environment of 30° C./80% RH, showing a lowering of environmental stability compared with that in Example 9.

Example 14

Polyester resin obtained by condensation of propoxylated bisphenol and fumaric acid 100 parts

| | |
|---|---|
| Phthalocyanine pigment | 4 parts |
| Chromium complex of di-tert-butylsalicylic acid | 4 parts |

The above materials were preliminarily thoroughly mixed using a Henschel mixer, and then melt-kneaded using a twin-screw extruder kneader. After cooled, the kneaded product was crushed using a hammer mill to give coarse particles of about 1 to 2 mm in diameter, which were then finely pulverized using a fine grinding mill of an air-jet system. The resulting finely pulverized product was classified to give colorant-containing resin particles with an average particle diameter of 8.3µ (quantity of triboelectricity: −19.5 µc/g).

The above colorant-containing resin particles and, based on 100 parts thereof, 0.5 part of fine titanium oxide particles with an average particle diameter of 18 mµ and a quantity of triboelectricity of −2.8 µc/g, synthesized from titanium isopropoxide by gaseous phase decomposition at 500° C., and 0.4 part of fine silica powder with an average particle diameter of 11 mµ and a quantity of triboelectricity of +30.5 µc/g, obtained by treating (150° C., 2 hours) a fine silica powder Aerosil 300 (trade name; available from Nippon Aerosil Co., Ltd.) with 20 parts of the silane coupling agent shown below as composition I, were compounded to give a cyan toner.

| |
|---|
| Composition I: |
| $(C_2H_5)_2N(CH_2)_3-Si+OCH_3)_3$     30 parts |
| 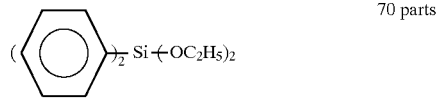    70 parts |

Next, 95 parts of a coated ferrite carrier comprised of Cu—Zn—Fe ferrite carrier cores having a weight average particle diameter of 45 µm (particle size distribution: particles with particle diameters less than 35µ, 4.2% by weight; particles with particle diameters of 35 to 40µ, 9.5% by weight; and particles with particle diameters not smaller than 74 µm, 0.2% by weight), coated with 0.5% by weight of a styrene/methyl methacrylate (40:60) copolymer (weight average molecular weight: 120,000), and 5 parts of the cyan toner were blended to give a developer.

This developer was applied in a commercially available plain-paper color copier (Color Laser Copier 500, manufactured by Canon Inc.) whose development contrast had been set at 300 V, and an image was reproduced in an environment of 23° C./65% RH. As a result, this image was in a density of as high as 1.52, free from fog, and sharp. Copies were thereafter further taken on 20,000 sheets, during which density decreased by as small as 0.07 and the same fog-free, sharp images as those at the initial stage were obtained. In an environment of low temperature and low humidity (20° C., 10% RH), images were reproduced. As as result, image density was as high as 1.48, and the quantity of triboelectricity in an environment of low humidity was effectively controlled.

In an environment of high temperature and high humidity (30° C., 80% RH), images were also reproduced. As as result, image density was 1.55, and very stable and good images were obtained. Initial images reproduced after the developer was left to stand for 1 month in each environment of 23° C./60% RH, 20° C./10% RH and 30° C./80% RH, also showed no undesirable changes.

Comparative Example 12

Images were reproduced in the same manner as in Example 14 except that the fine titanium oxide particles used therein was not used. As a result, fogging was recognized to have occurred in the environment of 20° C./10% RH. The evaluation test was stopped on 1,000th sheet copying because, during continuous copying, toner scatter occurred which was presumably due to faulty mixing of the toner and the carrier.

Example 15

Images were reproduced in the same manner as in Example 14 except that the composition I used therein was replaced with 0.3 part of fine silica powder (quantity of triboelectricity: +53 µc/g; average particle diameter: 12 mµ) having been treated with a silane coupling agent shown below. As a result, the same good results as in Example 14 were obtained.

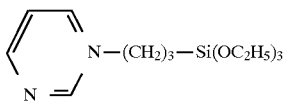

Example 16

Images were reproduced in the same manner as in Example 14 except that the fine titanium oxide particles used therein was replaced with 0.7 part of fine titanium oxide particles (quantity of triboelectricity: −11.5 µc/g; average particle diameter: 20 mµ) having been treated with a titanium coupling agent. As a result, the same good results as in Example 14 were obtained.

Example 17

Images were reproduced in the same manner as in Example 14 except that a cyan toner in which 1.0 part of fine titanium oxide particles and 0.3 part of fine silica powder were mixed was used and the developing assembly of CLC-500 was modified to the one used for non-magnetic one-component toners, as shown in FIG. 1. As a result, good results were obtained, without fogging and toner scatter.

The present invention makes use of the specific external additives as described above, and hence makes it possible to stabilize the triboelectric chargeability in various environments and obtain color images with a good quality.

We claim:

1. A negatively chargeable toner for developing an electrostatic image comprising non-magnetic colorant-containing resin particles having a weight average particle diameter from 4 μm to 10 μm and amorphous fine titanium oxide particles having been subjected to hydrophobic treatment in a carrier gas to provide hydrophobicity of 10 to 80%;

said colorant-containing resin particles containing a binder resin, a colorant and a negative charge control agent;

said amorphous fine titanium oxide particles being externally added in an amount of 0.01 to 5% by weight based on the weight of the colorant-containing resin particles;

wherein said amorphous fine titanium oxide particles comprise primary particles having an average particle diameter from 1 mμ to 40 mμ and having an average particle diameter from 5 mμ to 80 mμ for those present on said colorant-containing resin particles, wherein said toner has a bulk density from 0.35 g/cm$^3$ to 0.5 g/cm$^3$.

2. The toner according to claim 1, wherein said fine titanium oxide particles comprises primary particles having an average particle diameter of from 10 mμ to 30 mμ.

3. The toner according to claim 1, wherein said fine titanium oxide particles comprises primary particles having an average particle diameter of from 1 mμ to 40 mμ said toner having a degree of agglomeration of from 2% to 15% and a weight average particle diameter of from 4 μm to 10 μm.

4. The toner according to claim 1, wherein said fine titanium oxide particles are produced by thermally decomposing a volatile titanium compound at a temperature of 600° C. or below in a gaseous phase.

5. The toner according to claim 4, wherein said fine titanium oxide particles are produced from a titanium alkoxide by thermal decomposition.

6. The toner according to claim 4, wherein said fine titanium oxide particles are produced from a titanium halide by thermal decomposition.

7. The toner according to claim 1, wherein said fine titanium oxide particles are produced by thermally decomposing a volatile titanium compound at a temperature of from 250° C. to 400° C. in a gaseous phase.

8. The toner according to claim 1, wherein said fine titanium oxide particles are produced by thermally decomposing a volatile titanium compound in a gaseous phase and then cooled to a temperature at which the fine titanium oxide particles produced undergo no coalescence.

9. The toner according to claim 1, wherein said fine titanium oxide particles are chargeable to the same polarity as the colorant-containing resin particles to have a quantity of triboelectricity of not more than 30 μc/g as an absolute value, when brought into friction with iron powder.

10. The toner according to claim 1, wherein said fine titanium oxide particles have a quantity of triboelectricity of not more than 20 μc/g as an absolute value when brought into friction with iron powder.

11. The toner according to claim 1, wherein;

said fine titanium oxide particles are externally added as an external additive-A to the surfaces of said colorant-containing resin particles; said fine titanium oxide particles being capable of giving a quantity of triboelectricity of not more than 20 μc/g as an absolute value when brought into friction with iron powder; and an external additive-B is further added to the surfaces of said colorant-containing resin particles; said external additive-B being chargeable to a polarity reverse to that of said colorant-containing resin particles and in a quantity of triboelectricity of not less than 10 μc/g as an absolute value wherein brought into friction with iron powder;

said toner satisfying the condition of a≧b when the average particle diameter of said external additive-A is regarded as a̲ μ and the average particle diameter of said external additive-B as b̲ μ.

12. The toner according to claim 11, wherein said external additive-B comprises fine inorganic oxide particles.

13. The toner according to claim 11, wherein said external additive-B comprises fine inorganic oxide particles having been treated with an organic compound having a positively triboelectrically chargeable moiety.

14. The toner according to claim 11, wherein said external additive-B comprises fine inorganic oxide particles having been treated with a silane coupling agent having a positively triboelectrically chargeable moiety.

15. The toner according to claim 11, wherein said external additive-B comprises fine silica powder particles.

16. The toner according to claim 1, wherein said fine titanium oxide particles comprises amorphous, spherical fine titanium oxide particles produced by thermally decomposing a volatile titanium compound.

* * * * *

UNITED STATES PATENT AND TRADEMARK OFFICE
CERTIFICATE OF CORRECTION

PATENT NO. : 5,853,938

DATED : December 29, 1998

INVENTOR(S) : AKIHIKO NAKAZAWA ET AL.

It is certified that error appears in the above-identified patent and that said Letters Patent is hereby corrected as shown below:

COLUMN 2

Line 39, "of" should read --of a--.
    Line 65, "method" (first occurrence) should read --method,--.

COLUMN 3

Line 36, "by" should read --by the--.

COLUMN 8

Line 40, "ring" should read --bring--.

COLUMN 14

Line 42, "ably" should read --ably be--.

COLUMN 15

Line 35, "may" should be --may be--.
    Line 57, "in-the" should read --in the--.

UNITED STATES PATENT AND TRADEMARK OFFICE
CERTIFICATE OF CORRECTION

PATENT NO. : 5,853,938

DATED : December 29, 1998

INVENTOR(S) : AKIHIKO NAKAZAWA ET AL.

It is certified that error appears in the above-identified patent and that said Letters Patent is hereby corrected as shown below:

COLUMN 16

Line 6, "apart" should read --part--.
    Line 67, "one" should read --on one--.

COLUMN 18

Line 12, "this" should read --these--.

COLUMN 19

Line 53, "This" should read --These--.

COLUMN 21

Line 14, "was" should read --were--.

COLUMN 23

Line 64, "toner-scontaining" should read
      --toner-containing--.

UNITED STATES PATENT AND TRADEMARK OFFICE
CERTIFICATE OF CORRECTION

PATENT NO. : 5,853,938

DATED : December 29, 1998

INVENTOR(S) : AKIHIKO NAKAZAWA ET AL.

Page 3 of 4

It is certified that error appears in the above-identified patent and that said Letters Patent is hereby corrected as shown below:

COLUMN 25

```
Line 7, "This" should read --These--.
Line 11, "in" should be deleted.
Line 35, "the" (second occurrence) should read --of--.
Line 48, "the" (second occurrence) should read --of--.
```

COLUMN 27

```
Line 11-12, "Polyester resin obtained by condensation of
    propoxylated bisphenol and fumaric acid 100 parts"
    should be deleted.
Line 15, Insert into Table, --Polyester resin obtained by
    condensation of propoxylated bisphenol and fumaric
    acid 100 parts--.
```

COLUMN 28

```
Line 11, "as" should read --a--.
Line 22, "was" (first occurrence) should read --were--.
Line 48, "was" (first occurrence) should read --were--.
```

UNITED STATES PATENT AND TRADEMARK OFFICE
CERTIFICATE OF CORRECTION

PATENT NO. : 5,853,938

DATED : December 29, 1998

INVENTOR(S) : AKIHIKO NAKAZAWA ET AL.

It is certified that error appears in the above-identified patent and that said Letters Patent is hereby corrected as shown below:

COLUMN 29

Line 23, "comprises" should read --comprise--.
    Line 26, "comprises" should read --comprise--.

COLUMN 30

Line 24, "wherein" should read --when--.
    Line 26, "when" should read --wherein--.
    Line 43, "comprises" should read --comprise--.

Signed and Sealed this

First Day of February, 2000

Attest:

Q. TODD DICKINSON

*Attesting Officer*      Acting Commissioner of Patents and Trademarks